United States Patent
Li et al.

(10) Patent No.: US 8,724,588 B2
(45) Date of Patent: May 13, 2014

(54) MOBILITY MANAGEMENT ENTITY (MME) SELECTION WITHIN A BORDER REGION

(75) Inventors: Mingxing Li, San Jose, CA (US); Maria G. Lam, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 236 days.

(21) Appl. No.: 13/299,948

(22) Filed: Nov. 18, 2011

(65) Prior Publication Data
US 2013/0128862 A1     May 23, 2013

(51) Int. Cl.
*H04W 4/00* (2009.01)
(52) U.S. Cl.
USPC .......................................................... 370/331
(58) Field of Classification Search
None
See application file for complete search history.

(56) References Cited

U.S. PATENT DOCUMENTS

| | | | |
|---|---|---|---|
| 2008/0268842 A1* | 10/2008 | Herrero-Veron | 455/435.1 |
| 2009/0005051 A1* | 1/2009 | Voyer et al. | 455/445 |
| 2009/0303914 A1* | 12/2009 | Gonsa et al. | 370/312 |
| 2010/0080186 A1* | 4/2010 | Guo et al. | 370/329 |
| 2010/0322128 A1* | 12/2010 | Becker et al. | 370/312 |
| 2010/0323700 A1* | 12/2010 | Bachmann et al. | 455/436 |
| 2011/0153844 A1* | 6/2011 | Bovo et al. | 709/228 |
| 2011/0170423 A1* | 7/2011 | Engstrom | 370/242 |
| 2011/0171979 A1* | 7/2011 | Rune | 455/458 |
| 2012/0315914 A1* | 12/2012 | Zhang et al. | 455/439 |
| 2013/0100929 A1* | 4/2013 | Liu et al. | 370/331 |

* cited by examiner

*Primary Examiner* — Otis L Thompson, Jr.

(57) ABSTRACT

A system that includes an eNodeB device located in a border region between a first traffic area and a second traffic area, where the first traffic area includes a first pool of mobile management entities (MMEs), where the second traffic area includes a second, different pool of MMEs, and where the eNodeB is associated with the first pool of MMEs and the second pool of MMEs.

19 Claims, 6 Drawing Sheets

MOBILITY MANAGEMENT ENTITY (MME) SELECTION WITHIN A BORDER REGION

BACKGROUND

A user device may communicate with a network via a base station that processes traffic traveling between the user device and the network. The user device may communicate with the network while moving between cells associated with different base stations. User devices may communicate via the base stations to access services, such as to place or receive calls, send or receive messages, access applications, etc., via the network. The base stations may be located within different traffic areas, associated with the network, that are served by respective mobility management entity servers and/or other network devices.

The user device may change locations, which may cause the user device to be located within a border area where coverage associated with base stations within adjacent traffic areas overlap. The user device, when located within the border area, may be able to communicate with base stations that are located in the adjacent traffic areas. Unfortunately, the user device, when located within the border area, may be switched back and forth (sometimes referred to as "ping-ponging") between the base stations from the different traffic areas. The switching back and forth may cause excessive signaling to occur within the network. The excessive signaling may be caused by repeatedly establishing and terminating connections, between the base stations and the user device, which may waste network resources and/or reduce a quality of service experienced by the user device.

DETAILED DESCRIPTION OF PREFERRED EMBODIMENTS

The following detailed description refers to the accompanying drawings. The same reference numbers in different drawings may identify the same or similar elements.

A system and/or method, described herein, may enable a first eNodeB and a second eNodeB, located within a border region, to communicate with a first mobility management entity (MME) device, located within a first traffic area, and a second MME device, located within a second traffic area that is adjacent to the first traffic area. The border region may correspond to a geographic area associated with a common border between portions of the first traffic area and the second traffic area.

The first traffic area may include a first geographic area that includes one or more first eNodeBs that are located within the first geographic area and/or for which the first eNodeBs provide coverage. The second geographic area may include a second geographic area, adjacent to the first geographic area, that includes one or more second eNodeBs that are located within the second geographic area and/or for which the second eNodeBs provide coverage.

The system and/or method may allow the first eNodeB to communicate with the first MME device to establish a communication session with a user device located within the first traffic area. The first eNodeB may maintain the communication session, with the user device, by communicating with the first MME device when the user device moves to a location within the border region where the user device can communicate with the first eNodeB or a second eNodeB at the same time. The first eNodeB may handoff the user device to the second eNodeB that is also communicating with the first MME device. Handing off the user device to the second eNodeB that is communicating with the first MME device may allow the user device to move within the border region without changing between the first MME device and the second MME device. Not changing between the first MME device and the second MME device may reduce a quantity of signaling and/or network resource usage when the user device is within the border region. The second eNodeB may begin to communicate with the second MME device after the user device has moved to a location that is within the second traffic area and outside of the border region.

Enabling the first eNodeB and/or the second eNodeB to communicate with the first MME device and the second MME device may allow a communication session, associated with the user device located within a border region, to be maintained without repeatedly establishing and/or terminating connections between the first MME device and the first eNodeB and/or the second eNodeB as well as the second MME device and the first eNodeB and/or the second eNodeB. Avoiding repeatedly establishing and/or terminating the connections may reduce an amount of signaling associated with the communication session while the user device is located within the border region, which may save network resources.

Figure 1:
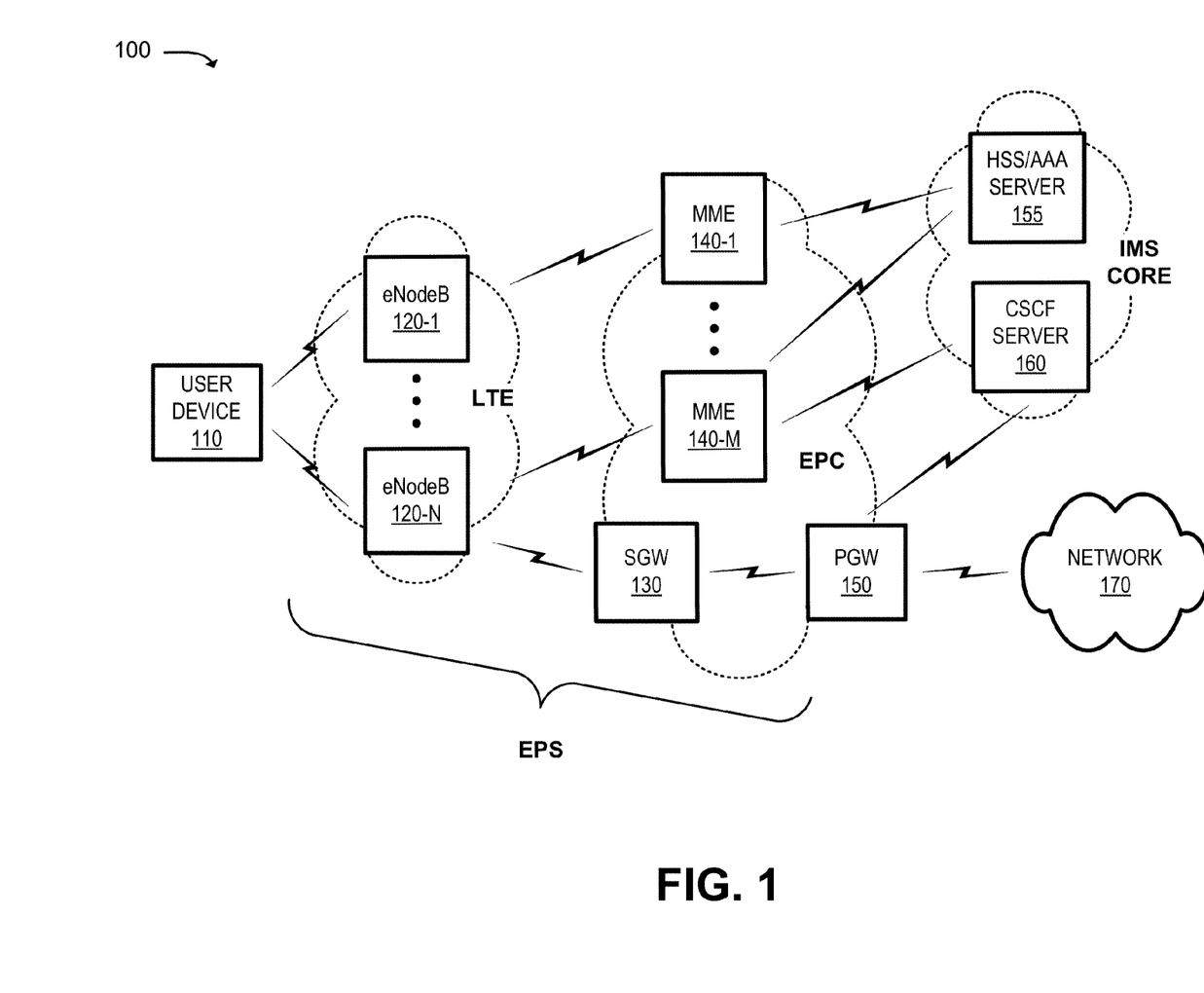
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, a group of eNodeBs 120-1, ..., 120-N (where N≥1) (hereinafter referred to collectively as "eNodeBs 120" and individually as "eNodeB 120"), a serving gateway 130 (hereinafter referred to as "SGW 130"), a group of mobility management entity devices 140-1, ... 140-M (where M≥1) (hereinafter referred to collectively as "MMEs 140" and individually as "MME 140"), a packet data network (PDN) gateway (PGW) 150, a home subscriber server (HSS)/authentication, authorization, accounting (AAA) server 155 (hereinafter referred to as an "HSS/AAA server 155"), a call session control function (CSCF) server 160 (hereinafter referred to as "CSCF server 160"), and a network 170. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Environment 100 may include an evolved packet system (EPS) that includes a long term evolution (LTE) network and/or an evolved packet core (EPC) that operate based on a third generation partnership project (3GPP) wireless communication standards. The LTE network may be a radio access network (RAN) that includes one or more eNodeBs 120 via which user device 110 communicates with the EPC. The EPC may include SGW 130, MMEs 140, and/or PGW 150 that enables user device 110 to communicate with network 170 and/or an Internet protocol (IP) multimedia subsystem (IMS) core. The IMS core may include HSS/AAA server 155 and/or CSCF server 160 and may manage authentication, session initiation, account information, a user profile, etc. associated with user device 110.

User device 110 may include any computation or communication device, such as a wireless mobile communication device that is capable of communicating with eNodeB 120 and/or a network (e.g., network 170). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 110 may send traffic to and/or receive traffic from network 170.

User device 110 may send, to eNodeB 120, a request to establish a connection. User device 110 may measure radio conditions, such signal strength, bandwidth usage, signal noise, etc. associated with communications with eNodeB 120. User device 110 may transmit, to eNodeB 120 and as radio information, the measured radio conditions. User device 110 may transmit information associated with a location of user device 110 based on a global positioning satellite (GPS) component or some other component that provides the information associated with the location.

eNodeB 120 may include one or more devices that receive, process, and/or transmit traffic, such as audio, video, text, and/or other data, destined for and/or received from user device 110. eNodeB 120 may receive traffic from and/or send traffic to network 170 via SGW 130 and PGW 150. eNodeB 120 may send traffic to and/or receive traffic from user device 110 via an air interface. One or more of eNodeBs 120 may be associated with a RAN. The RAN may be associated with the LTE network.

eNodeB 120 may be associated with a traffic area and may communicate with one or more MMEs 140 associated with the traffic area. eNodeB 120 may obtain information, associated with load conditions (e.g., bandwidth usage, data throughput, reserve processing capacity, etc.), from the one or more MMEs 140. eNodeB 120 may determine with which of the one or more MMEs 140, to communicate based on the load conditions.

A border eNodeB 120 may be located within a border region that corresponds to a geographical area where a first traffic area and an adjacent second traffic area overlap. The border eNodeB 120 may communicate with a first MME 140, associated with a first pool of MMEs 140, within the first traffic area. The border eNodeB 120 may also communicate with a second MME 140, associated with a second pool of MMEs 140, within the second traffic area. Border eNodeB 120 may communicate with user device 110 located within the first traffic area and may communicate with the first MME 140 to establish a communication session with user device 110. Border eNodeB 120 may maintain the connection, with user device 110, when user device 110 moves into the border region. Border eNodeB 120 may communicate with the first MME 140 to maintain the connection within the border region.

Border eNodeB 120 may handoff the user device 110 to another border eNodeB 120 that is also communicating with the first MME 140. The other border eNodeB 120 may communicate with a second MME 140, associated with the second pool of MMEs 140, when user device 110 exits the border region. The other border eNodeB 120 may handoff user device 110 to eNodeB 120 that is located within the second traffic area and which communicates with a second MME device 140 associated with the second pool of MMEs 140.

SGW 130 may include one or more devices, or other types of computation or communication devices, that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more eNodeBs 120 and may send the aggregated traffic to network 170. SGW 130 may also receive traffic from network 170 and may send the received traffic to user device 110 via eNodeB 120.

MME 140 may include one or more computation or communication devices that gather, process, search, store, and/or provide information in a manner described herein. For example, MME 140 may perform operations associated with handing off user device 110, from a first eNodeB 120 to a second eNodeB 120, when user device 110 is exiting a cell associated with the first eNodeB 120 and entering a cell associated with another eNodeB 120. MME 140 may, in yet another example, perform an operation to handoff user device 110 from the second eNodeB 120 to the first eNodeB 120 when user device 110 is entering the cell associated with first eNodeB 120. MME 140 may be associated with an MME pool associated with a traffic area and may serve one or more eNodeBs 120 associated with the traffic area. Additionally, or alternatively, MME 140 may serve a border eNodeB 120 associated with an adjacent traffic area and potentially may communicate with another MME 140 associated with a different MME pool when handing off user device 110.

PGW 150 may include one or more computation or communication devices that gather, process, search, store, and/or provide information in a manner described herein. PGW 150 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 150 may include a device that aggregates traffic received from one or more SGWs 130, etc. and may send the aggregated traffic to network 170. In another example implementation, PGW 150 may receive traffic from network 170 and may send the traffic toward user device 110 via SGW 130.

HSS/AAA server 155 may include one or more server devices, or other types of computation or communication devices, that gather, process, search, store, and/or provide information in a manner described herein. For example, HSS/AAA server 155 may manage, update, and/or store, in a memory associated with HSS/AAA server 155, profile information associated with user device 110 that identifies applications and/or services that are permitted for and/or accessible by user device 110, information associated with a user of user device 110 (e.g., a username, a password, a personal identification number (PIN), etc.), rate information, minutes allowed, and/or other information. Additionally, or alternatively, HSS/AAA server 155 may include a device that performs authentication, authorization, and/or accounting (AAA) operations associated with a communication session with user device 110.

CSCF server 160 may include one or more server devices, or other types of computation or communication devices, that gather, process, search, store, and/or provide information in a manner described herein. CSCF server 160 may process and/or route calls to and from user device 110 via the EPC. For example, CSCF server 160 may process calls, received from network 170, that are destined for user device 110. In another example, CSCF server 160 may process calls, received from user device 110, that are destined for network 170.

Network 170 may include one or more wired and/or wireless networks. For example, network 170 may include a cellular network, a public land mobile network (PLMN), a second generation (2G) network, a third generation (3G) network, a fourth generation (4G) network, a fifth generation (5G) network, and/or another network. Additionally, or alternatively, network 170 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

Figure 2:
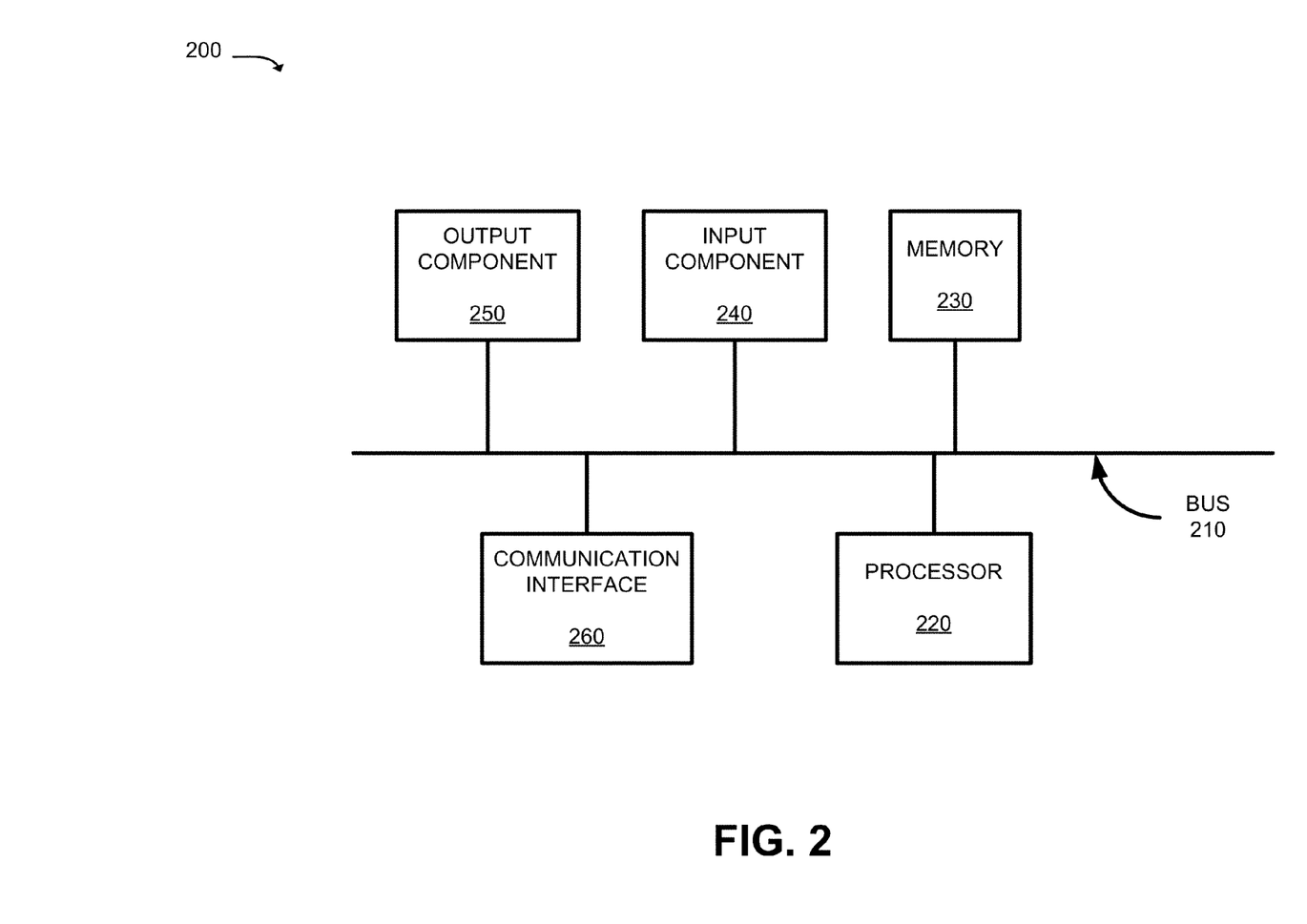
FIG. 2 is a diagram of example components of one or more devices of FIG. 1.

FIG. 2 is a diagram of example components of a device 200. Device 200 may correspond to user device 110, SGW, 130, MME 140, PGW 150, HSS/AAA server 155, and/or CSCF server 160. Alternatively, or additionally, each of user device 110, SGW 130, MME 140, PGW 150, HSS/AAA server 155, and/or CSCF server 160 may include one or more devices 200 and/or one or more components of device 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications, wired communications, or a combination of wireless and wired communications. For example, communication interface 260 may include mechanisms for communicating with another device or system via a network, such as network 170. In one alternative implementation, communication interface 260 may be a logical component that includes input and output ports, input and output systems, and/or other input and output components that facilitate the transmission of data to other devices.

As described herein, device 200 may perform certain operations associated with establishing a communication session with user device 110. Device 200 may perform these and other operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
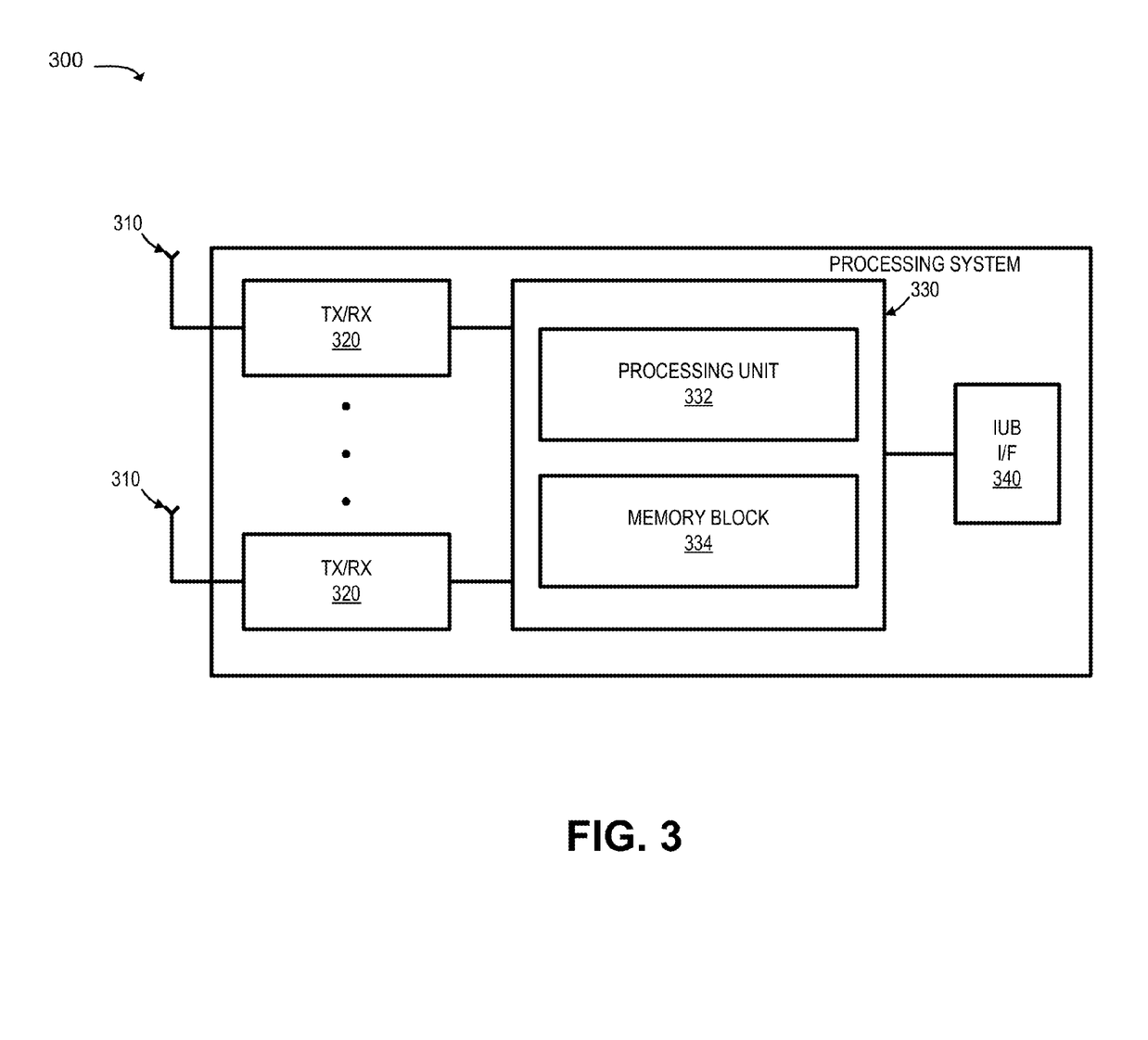
FIG. 3 is a diagram of example components of an eNodeB of FIG. 1, according to an implementation described herein.

FIG. 3 is a diagram of example components of eNodeB 120 according to an implementation described herein. As shown in FIG. 3, eNodeB 120 may include antennas 310, transceivers (TX/RX) 320, processing system 330, and Iub interface (I/F) 340. eNodeB 120 may include fewer components, additional components, different components, and/or differently arranged components than those illustrated in FIG. 3. Additionally, or alternatively, one or more operations described as being performed by a particular component of eNodeB 120 may be performed by one or more other components, in addition to or instead of the particular component of eNodeB 120.

Antennas 310 may include one or more directional and/or omnidirectional antennas. Transceivers 320 may be associated with antennas 310 and include transceiver circuitry for transmitting and/or receiving symbol sequences in a network, such as network 110, via antennas 310.

Processing system 330 may control the operation of eNodeB 120. Processing system 330 may also process information received via transceivers 320 and Iub interface 340. Processing system 330 may further measure quality and strength of connection and determine a frame error rate (FER), and transmit this information to MME 140 and/or some other device. As illustrated, processing system 330 may include a processing unit 332 and a memory block 334. It will be appreciated that processing system 330 may include fewer components, additional components, different components, and/or differently arranged components than illustrated in FIG. 3.

Processing unit 332 may process information received via transceivers 320 and Iub interface 340. The processing may include, for example, data conversion, forward error correction (FEC), rate adaptation, Wideband Code Division Multiple Access (WCDMA) spreading/dispreading, and quadrature phase shift keying (QPSK) modulation, etc. In addition, processing unit 332 may generate control messages and/or data messages (e.g., within high speed-downlink shared channel (HS-DSCH) data frames) and cause those control messages and/or data messages to be transmitted via transceivers 320 and/or Iub interface 340. Processing unit 332 may also process control messages and/or data messages received from transceivers 320 and/or Iub interface 340.

Memory block 334 may store information (e.g., in the form of protocol data units (PDUs)) to be transmitted to and/or that has been received from user device 110. In one embodiment, each user device 110 associated with eNodeB 120 may be associated with one or more priority queues from memory block 334. A priority queue may, for example, be initialized for user device 110 when a media access control-d (MAC-d) flow is established for that user device 110.

Memory block 334 may map received logical channel identifiers to priority queue identifiers. In one embodiment, a HS-DSCH framing protocol type 2 data frame may associate one or more logical channel identifiers with one or more PDUs stored in the data frame. eNodeB 120 may use the logical channel identifiers to identify the appropriate priority queues from memory block 334 for storing the PDUs.

Iub interface 340 may include one or more line cards that allow eNodeB 120 to transmit data to and receive data from radio MME 140.

Figure 4:
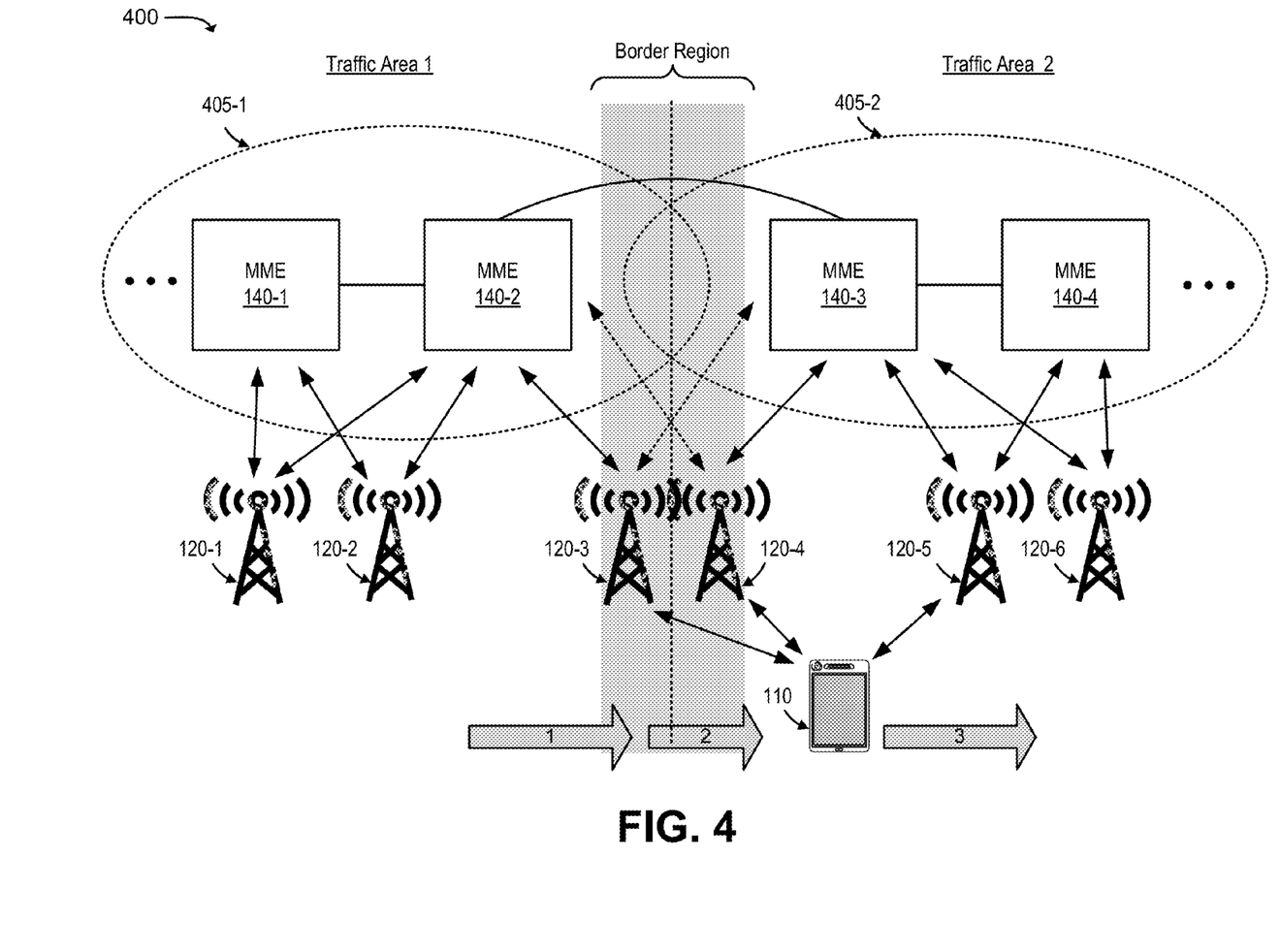
FIG. 4 is a diagram of example portion of the environment of FIG. 1.

FIG. 4 is a diagram of example portion 400, of environment 100, associated traffic areas and a border region in which one or more eNodeBs 120 and/or MMEs 140 are located. Environment portion 400 may include a first traffic area (e.g., traffic area 1) and a second traffic area (e.g., traffic area 2). The first traffic area may be associated with a first MME pool 405-1 with which MME 140-1 and MME 140-2 are associated. The second traffic area may be associated with a second MME pool 405-2 with which MME 140-3 and MME 140-4 are associated.

eNodeBs 120-1-120-3 may be located within the first traffic area 405-1 and may be served by MMEs 140 associated with the first MME pool 405-1. eNodeBs 120-4-120-6 may be located within the second traffic area 405-2 and may be served by MMEs 140 associated with the second MME pool 405-2.

The first traffic area and the second traffic area may overlap to create a border region (e.g., represented as the shaded rectangle labeled "Border Region") that includes a portion of the first traffic area and a portion of the second traffic area. The border region may represent a geographic area where cell coverage, associated with one or more eNodeBs 120 located within the first traffic area, overlap cell coverage associated with one or more eNodeBs 120 located within the second traffic area. Border eNodeB 120-3 may be located within the portion of the first traffic area associated with the border region. Border eNodeB 120-4 may be located within the portion of the second traffic area associated with the border region.

User device 110 may be located within the first traffic area and may communicate with any of eNodeBs 120, associated with the first traffic area to request access to a network (e.g., network 170). eNodeB 120, associated with the first traffic area, may communicate with one of MMEs 140, associated with the first MME pool 405-1, to establish a communication session with user device 110. User device 110 may change location within the first traffic area (e.g., as shown by the arrow labeled as "1"), which may cause eNodeB 120 to handoff user device 110 to another eNodeB 120 associated with the first traffic area.

User device 110 may approach and/or enter a portion of the first traffic area associated with the border region, which may cause user device 110 to be handed off to border eNodeB 120-3. Border eNodeB 120-3 may communicate with user device 110 and/or one or more of MMEs 140, associated with the first MME pool 405-1 (e.g., MME 140-1, MME 140-2, etc.) to maintain the communication session.

User device 110 may change location within the border region that causes user device 110 to move into a portion of the border region associated with the second traffic area (e.g., as shown by the arrow labeled as "2"). While located within the border region, signal strength and/or signal quality, received by user device 110 from border eNodeB 120-3 and/or border eNodeB 120-4, may be sufficient to allow user device 110 to communicate with either eNodeB 120-3 and/or eNodeB 120-4. Border eNodeB 120-3 may handoff user device 110 to border eNodeB 120-4 and border eNodeB 120-4 may maintain the communication session, associated with user device 110, by communicating with MME 140 associated with the first MME pool 405-1 (e.g., MME 140-2) with which border eNodeB 120-3 was communicating. Border eNodeB 120-4 may communicate with MME 140-2 so that user device 110 may move within the border region without network resources being wasted due to repeated connecting and/or terminating connections between border eNodeBs 120 and MMEs 140 associated with different MME pools 405.

When user device 110 changes location by exiting the border region and moving into a portion of the second traffic area that is not located within the border region (e.g., as shown by the arrow labeled as "3"), border eNodeB 120-4 may maintain the communication session with user device 110 by communicating with one or more MMEs 140 associated with the second MME pool 405-2 (e.g., MME 140-3, MME 140-4, etc.). As user device 110 continues to move into the second traffic area and away from the border region, border eNodeB 120-4 may handoff user device 110 to another eNodeB 120 located within the second traffic area (e.g., eNodeB 120-5). User device 110 may trigger the handoff to the other eNodeB 120 within the second traffic area when an amount of signal strength, received from the other eNodeB 120, is greater than another amount of signal strength received from eNodeB 120-4. Additionally, or alternatively, the radio information may indicate that user device 110 is to be handed off to eNodeB 120-4 and/or is entering the second traffic area when the amount of signal strength, received from eNodeB 120-4, is less than a threshold and/or the other amount of signal strength, received from the other eNodeB 120 is greater than a threshold.

Figure 5:
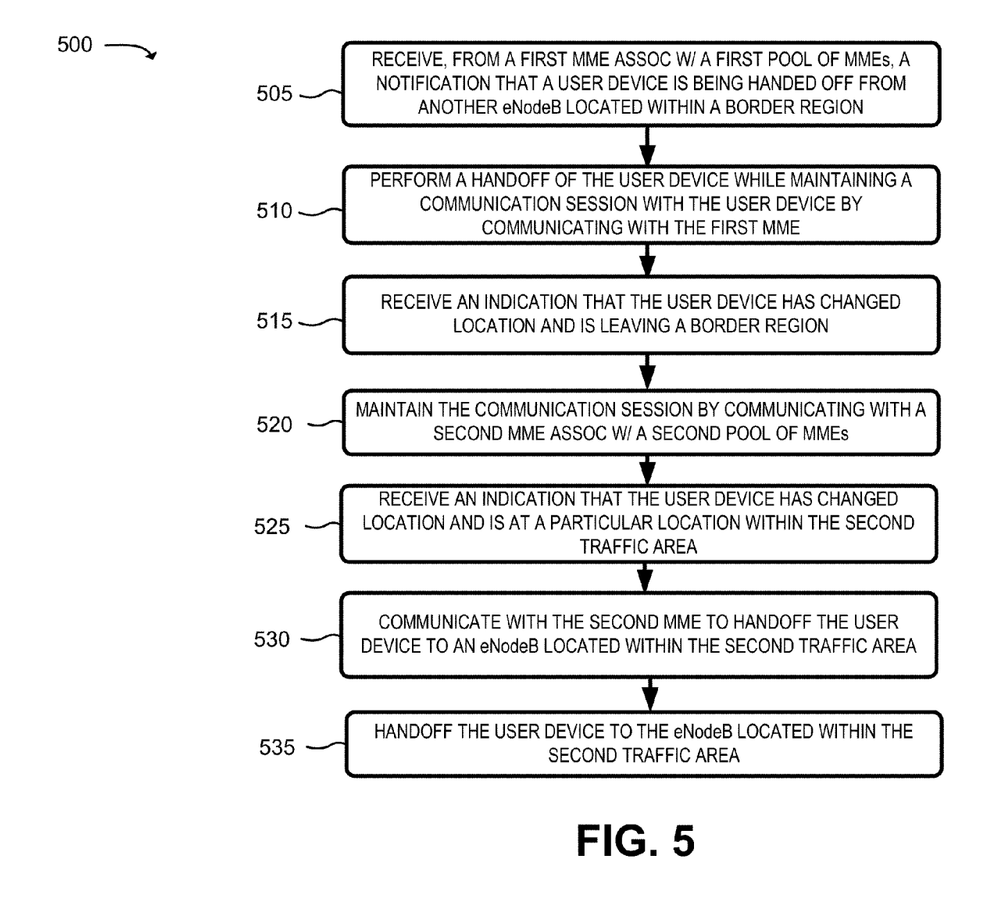
FIG. 5 is a flow chart of an example process for managing connections between a user device and eNodeBs located within a border region.
Figure 6:
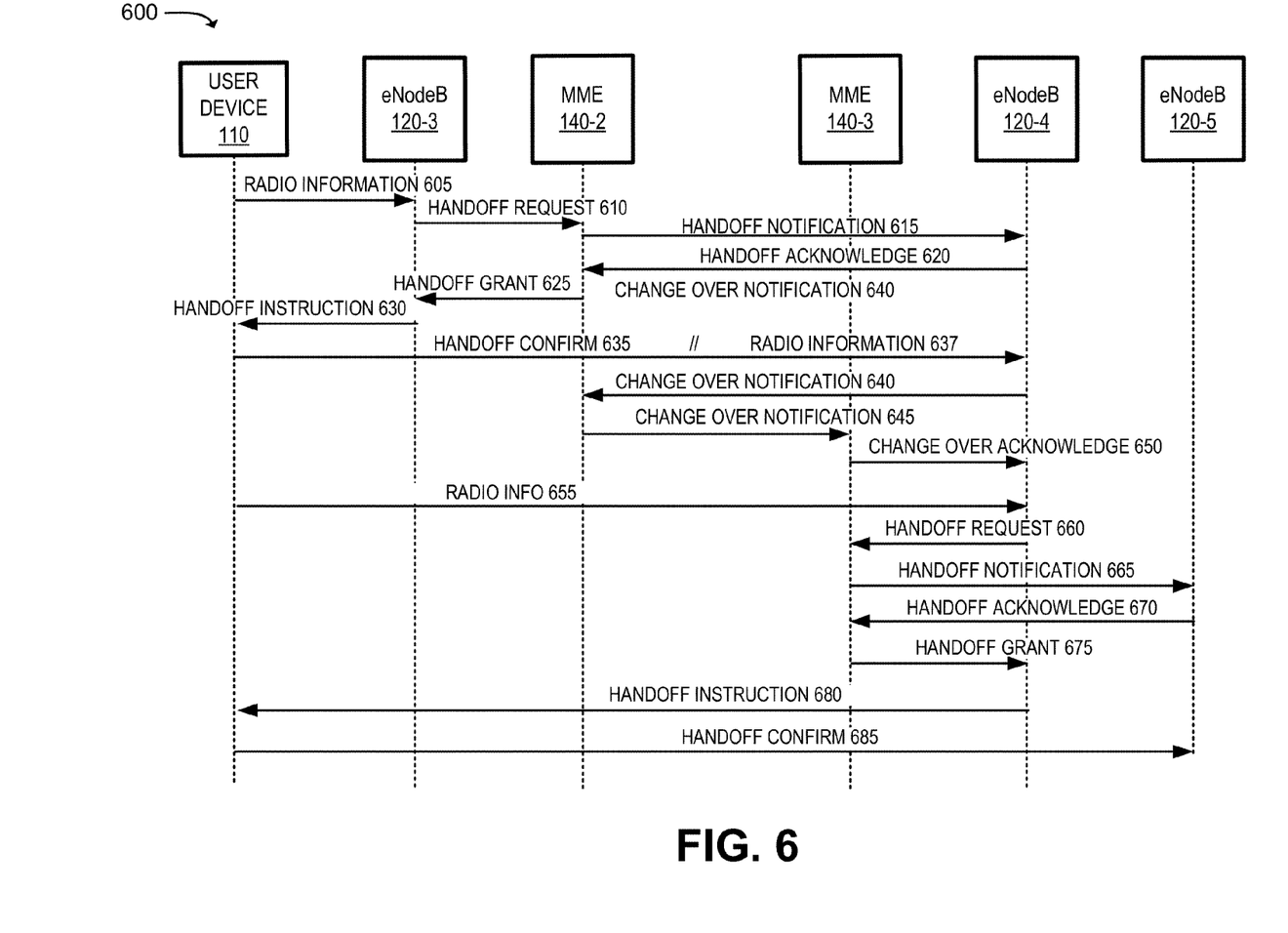
FIG. 6 is an example signal flow diagram associated with managing connections between a user device and eNodeBs located within a border region.

FIG. 5 is a flow chart of an example process 500 for managing connections between a user device and border eNodeBs located within a border region. In one example implementation, process 500 may be performed by eNodeB 120. In another example implementation, some or all of process 500 may be performed by a device or collection of devices separate from, or in combination with eNodeB 120. FIG. 6 is an example signal flow diagram 600 associated with managing connections between a user device and eNodeBs located within a border region. In the description below, all or a portion of process 500 of FIG. 5 will be described with references to signal flow diagram 600 of FIG. 6.

As shown in FIG. 5, process 500 may include receiving, from a first MME associated with a first pool of MMEs, a notification that a user device is being handed off from another eNodeB located within a border region (block 505). For example, eNodeB 120, located within a border region (e.g., first border eNodeB 120-3), may communicate with one or more MMEs 140 (e.g., first MME 140-1, 140-2, etc.), associated with a first MME pool, to maintain a communication session with user device 110. User device 110 may be entering the border region from a first traffic area. User device 110 may change locations within the border region and may transmit radio information 605 (FIG. 6) to first border eNodeB 120-3 that identifies a location associated with user device 110 (e.g., based on GPS information, an identifier of a cell associated with first border eNodeB 120-3, etc.).

First border eNodeB 120-3 may receive radio information 605 and may determine, based on radio information 605, that user device 110 is moving out of a coverage area associated with first border eNodeB 120 and/or has entered a coverage area associated with another eNodeB 120 that is located within the border area (e.g., second border eNodeB 120-4). First border eNodeB 120-3 may, for example, determine that user device 110 is moving out of the coverage area when the radio information indicates that a first amount of signal strength, received from second border eNodeB 120-4, is greater than a second amount of signal strength, received from first border eNodeB 120-3. Additionally, or alternatively, first border eNodeB 120-3 may determine that user device 110 is moving out of the coverage area when the radio information indicates that the second amount of signal strength is less than a threshold. Additionally, or alternatively, first border eNodeB 120-3 may determine that user device 110 is moving out of the coverage area when the radio information includes location information that indicates that user device 110 is moving out of the coverage area.

Based on the determination that user device 110 has entered the coverage area associated with second border eNodeB 120-4, first border eNodeB 120-3 may transmit handoff request 610 (FIG. 6) to MME 140 associated with the first MME pool (e.g., first MME 140-1, 140-2, etc.), requesting to handoff user device 110 to second border eNodeB 120-4. First MME 140 may receive handoff request 610 and may transmit handoff notification 615 (FIG. 6) to second border eNodeB 120-4 indicating that a communication session, associated with user device 110, is to be handed off to second eNodeB 120-4. Second eNodeB 120-4 may receive handoff notification 615.

Additionally, or alternatively, user device 110 may power up while located within the border region and may, as a result of powering up, transmit an access request to one or both of border eNodeBs 120 (e.g., first border eNodeB 120-3 and/or second border eNodeB 120-4). In one example, first eNodeB 120-3 may receive the access request. First border eNodeB 120-3 may be connected and/or able to communicate with either first MME 140 (e.g., MME 140-1, 140-2, etc.) associated with a first MME pool, or a second MME 140 (e.g., second MME 140-3, 140-4, etc.), associated with a second MME pool. First border eNodeB 120-3 may, determine that user device 110 is located within a portion of the border region that corresponds to a same traffic area (e.g., the first traffic area) in which first border eNodeB 120-3 is located. Based on the determination that user device 110 is located within the same traffic area, first border eNodeB 120-3 may establish a communication session with user device 110 by communicating with first MME 140, associated with the first MME pool, that serves eNodeBs 120 located within the first traffic area. In another example, second eNodeB 120-4 may receive the access request when another user device 110 powers up within a portion of the border region that is located within the second traffic area. Although second border eNodeB 120-4 may be connected and/or able to communicate with one or more first MMEs 140 and one or more second MMEs 140, second border eNodeB 120-4 may communicate with second MME 140 (e.g., second MME 140-3, 140-4, etc.) to establish the session with the other user device 110 due to second border eNodeB 120-4 being at a location, within the border region, that is located within a same traffic area as the other user device 110 (e.g., the second traffic area) and that is served by second MME 140.

As also shown in FIG. 5, process 500 may include performing a handoff of the user device while maintaining a communication session with the user device by communicating with the first MME (block 510). For example, second border eNodeB 120-4 may obtain from handoff notification 615, information associated with user device 110, such as a device identifier (e.g., an MDN, etc.), a network address (e.g., an IP address, a media access control (MAC) address, etc.), etc, and/or information associated with bandwidth resources, protocols, signal bearers, etc. associated with the communication session with user device 110. Second border eNodeB 120-4 may transmit handoff acknowledge 620 (FIG. 6), to first MME 140-2, that acknowledges that user device 110 is to be handed off to second border eNodeB 120-4.

First MME 140-2 may receive handoff acknowledge 620 and may transmit handoff grant 625 (FIG. 6), to first border eNodeB 120-3, indicating that the handoff is authorized. First border eNodeB 120-3 may receive handoff grant 625 and may transmit handoff instruction 630 (FIG. 6), to user device 110, that instructs user device 110 to begin communicating with second border eNodeB 120-4. User device 110 may receive handoff instruction 630 and may transmit handoff confirm 635 (FIG. 6), to second border eNodeB 120-4, confirming that user device 110 will be communicating with second border eNodeB 120-4. Second border eNodeB 120-4 may receive handoff confirm 635 and may maintain the communication session with user device 110 by communicating with first MME 140-2.

As further shown in FIG. 5, process 500 may include receiving an indication that user device has changed location and is leaving the border region (block 515) and may maintain the communication session by communicating with a second MME associated with a second pool of MMEs (block 520). For example, user device 110 may change location may transmit radio information 637 (FIG. 6), to second border eNodeB 120-4, that indicates user device 110 is exiting the border region and/or entering a portion of a second traffic area that is not within the border region. The radio information may, in a manner similar to that described above, indicate that user device 110 is exiting the border region and/or entering the second traffic area when the radio information indicates that the second amount of signal strength, received from second border eNodeB 120-4, is less than a third amount of signal strength received from eNodeB 120 located within the second traffic area (e.g., eNodeB 120-5, 120-6, etc.). Additionally, or alternatively, the radio information may indicate that user device 110 is exiting the border region and/or entering the second traffic area when the second amount of signal strength is less than a threshold and/or the third amount of signal strength is greater than a threshold. Additionally, or alternatively, the radio information may indicate that user device 110 is exiting the border region and/or entering the second traffic area when location information, within the radio information, indicates that user device 110 is exiting the border region and/or entering the second traffic area.

Second border eNodeB 120-4 may receive radio information 637 and may transmit change over notification 640 (FIG. 6), to first MME 140-2, indicating that user device 110 is exiting the border region and/or is entering the portion of the second traffic area. Change over notification 640 may also notify first MME 140-2 that second border eNodeB 120-4 will begin communicating with second MME 140-3 associated with a different pool of MMEs (e.g., the second pool of MMEs associated with the second traffic area).

First MME 140-2 may receive change over notification 640 and may transmit change over notification 645 (FIG. 6), to second MME 140-3, indicating that second border eNodeB 120-4 will be communicating with second MME 140-3 so that the communication session, associated with user device 110, can be maintained as a result of user device 110 changing location. Change over notification 645 may include the information associated with user device 110, information that identifies signal bearers (e.g., SGW 130, PGW 150, etc.), traffic flows, protocols, bandwidth, etc. associated with the communication session. Second MME 140-3 may receive change over notification 645 and may transmit change over acknowledge 650 (FIG. 6), to second border eNodeB 120-4, indicating that the communication session is to be maintained via communication with second MME 140-3. Second border eNodeB 120-4 may receive change over acknowledge 650 and may maintain the communication session with user device 110 by communicating with second MME 140-3.

As still further shown in FIG. 5, process 500 may include receiving an indication that the user device has changed location and is at a particular location within a second traffic area (block 525) and communicating with the second MME to handoff the user device to an eNodeB located within the second traffic area (block 530). For example, user device 110 may change location and may transmit radio information 655 (FIG. 6), to second border eNodeB 120-4, indicating that user device 110 is located within a coverage area of eNodeB 120 that is located within the second traffic area (e.g., eNodeB 120-5). Second border eNodeB 120-4 may receive radio information 655 and may transmit handoff request 660 (FIG. 6), to second MME 140-3, requesting that user device 110 be handed off to eNodeB 120-5.

Second MME 140-3 may receive handoff request 660 and may transmit handoff notification 665 (FIG. 6), to eNodeB 120-5, notifying eNodeB 120-5 that a communication session, associated with user device 110, is to be handed off to eNodeB 120-5. eNodeB 120-5 may receive handoff notification 665 and may transmit handoff acknowledge 670 (FIG. 6), to second MME 140-3, acknowledging that the communication session is to be handed off. Second MME 140-3 may receive handoff acknowledge 670 and may transmit handoff grant 675 (FIG. 6), to second border eNodeB 120-4, authorizing the handoff of user device 110 to eNodeB 120-5.

As yet further shown in FIG. 5, process 500 may include handing off the user device to the eNodeB located within the second traffic area (block 535). For example, second border eNodeB 120-4 may receive handoff grant 675 and may transmit handoff instruction 680 (FIG. 6), to user device 110, instructing user device 110 to begin communicating with eNodeB 120-5. User device 110 may receive handoff instruction 680 and may transmit handoff confirm 685 (FIG. 6), to eNodeB 120-5, indicating that user device 110 may begin communicating with eNodeB 120-5.

A system and/or method, described herein, may enable a first border eNodeB and a second border eNodeB, located within a border region, to communicate with a first MME, associated with a first pool of MMEs, and a second MME associated with a second pool of MMEs. The system and/or method may allow the first eNodeB to communicate with the first MME device to establish and/or maintain a communication session with a user device located within a first traffic area and/or the border region. When the user device moves to a location, within the border region, where the user device can communicate with the second border eNodeB, the first border eNodeB may handoff the user device to the second border eNodeB that is also communicating with the first MME device. As the user device begins to exit the border region and/or enter a second traffic area that is not located within the border region, the second border eNodeB may communicate with the second MME so that the session can be maintained with the user device.

Handing off the user device to the second eNodeB that is capable of communicating with the first MME and the second MME may allow the user device to move within the border region without repeatedly changing between the first MME device and the second MME device. Not changing between the first MME device and the second MME device, while the user device is moving within the border region, may reduce a quantity of signaling and/or network resource usage when the user device is changing location within the border region.

The foregoing description provides illustration and description, but is not intended to be exhaustive or to limit the implementations to the precise form disclosed. Modifications and variations are possible in light of the above disclosure or may be acquired from practice of the embodiments.

While a series of blocks have been described with regard to FIG. 5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving, by a first eNodeB device and from a first mobility management entity (MME) device, an indication that a user device, located within a region, is to be handed off from a second eNodeB device to the first eNodeB device, where the region includes a geographic area where coverage from the first eNodeB device overlaps coverage from the second eNodeB device, and where the first MME device is associated with a first pool of MME devices that are located within a first traffic area;
communicating with the first MME device, by the first eNodeB device and as a result of receiving the indication, that enables the user device to be handed off in a manner that maintains a communication session associated with the user device;

receiving, by the first eNodeB device and from the user device, traffic associated with the communication session as a result of the user device being handed off in the manner that maintains the communication session;

determining, by the first eNodeB device, that the user device is leaving the region and entering a second traffic area in which a second pool of MME devices are located; and communicating, by the first eNodeB device, with a second MME device, associated with the second pool of MME devices, to maintain the session with the user device based on the determination that the user device is leaving the region and entering the second traffic area.

2. The method of claim 1, where the first eNodeB device is located within the region, and where the first eNodeB device is located within a portion of the second traffic area that is located within the region.

3. The method of claim 1, where the second eNodeB device is located within the region, and where the second eNodeB device is located within a portion of the first traffic area that is located within the region.

4. The method of claim 1, where determining that the user device is leaving the region and entering the second traffic area further includes:
receiving, from the user device, radio information that identifies that the user device is leaving the region and entering the second traffic area; or
identifying that the user device is leaving the region and entering the second traffic area based on signals received, from the user device, via one or more cells associated with the first eNodeB device.

5. The method of claim 1, where receiving the indication that the user device is to be handed off further includes:
obtaining, from the indication information associated with the communication session, where the information, associated with the communication session, includes at least one of:
information associated with the user device, information associated with a traffic flow associated with the communication session,
information that identifies bandwidth resources being used during the communication session,
information associated with protocols associated with the communication session, or
information associated with signal bearers carrying traffic associated with the communication session.

6. The method of claim 1, where communicating with the first MME device that enables the user device to be handed off further includes:
transmitting, to the first MME device, a notification that acknowledges that the user device is to be handed off to the first eNodeB device; and
establishing a connection with the user device.

7. The method of claim 1, further comprising:
receiving from the second MME device, an indication that another user device, located within the second traffic area, is being handed off from an eNodeB device that is located within the second traffic area;
communicating with the second MME device that allows another communication session, associated with the other user device, to be maintained when the other user device is handed off from the eNodeB device; and
communicating with the other user device to establish a connection with the other user device that allows traffic associated with the other communication session to be received from or transmitted to the other user device.

8. The method of claim 7, further comprising:
determining that the other user device has moved to a location within a portion of the first traffic that lies within the region; and
communicating with the second MME device to cause the other user device to be handed off to the second eNodeB device, in a manner that allows the second eNodeB device to communicate with the second MME device so that the other communication session can be maintained.

9. The method of claim 1, further comprising:
receiving, from another user device that has powered up within the region, a request to access a network; and
communicating, in response to the request to access the network, with the first MME device or the second MME device to establish another communication session with the other user device.

10. The method of claim 9, where communicating with the first MME device or the second MME device to establish the other communication session further includes:
communicating with the first MME device to establish the other communication session when the first eNodeB device is located within a portion of the region that is located within the first traffic area in which the first pool of MME devices is located; and
communicating with the second MME device to establish the other communication session when the first eNodeB device is at a location within a portion of the region that is located within the second traffic area, in which the second pool of MME devices is located.

11. A system comprising:
an eNodeB device located in a border region between a first traffic area and a second traffic area, the first traffic area including a first pool of mobile management entities (MMEs), the second traffic area including a second, different pool of MMEs, the eNodeB device being associated with the first pool of MMEs and the second pool of MMEs, and
another eNodeB device located within the border region, the other eNodeB device being associated with the first pool of MMEs and the second pool of MMEs,
wherein the eNodeB device further comprises processing logic configured to:
receive an indication that a user device, located within the border region, is to be handed off, from the other eNodeB device,
communicate, as a result of receiving the indication, with at least one MME, of the first pool of MMEs, to handoff the user device to the eNodeB device,
wherein the communicating with the at least one MME, of the first pool of MMEs allows a communication session, associated with the user device, to be maintained, and
communicate, with the user device to send or receive traffic associated with the communication session.

12. The system of claim 11, where the eNodeB device is:
connected to at least a first MME of the first pool of MMEs, and
connected to at least a second MME of the second pool of MMEs.

13. The system of claim 12, where being connected to the at least first MME and the at least second MME allows the eNodeB device to communicate with the at least first MME and the at least second MME.

14. The system of claim 11, where the eNodeB device is:
connected to at least a first MME of the first pool of MMEs, and
connected to at least a second MME of the second pool of MMEs; and where the other eNodeB device is:
    connected to the at least first MME of the first pool of MMEs, and
    connected to the at least second MME of the second pool of MMEs.

15. The system of claim 14, where the eNodeB device is further to:
    determine that the user device has moved to a location that is within the second traffic area,
    transmit, to the at least first MME, a notification that the eNodeB device is to begin communicating with the at least second MME to maintain the communication session, associated with the user device, based on the determination that the user device has moved to the location that is within the second traffic area,
    where the notification allows the at least first MME to provide, to the at least second MME,
        information associated with the communication session, and
    communicate with the at least second MME to maintain the communication session.

16. The system of claim 11, where the eNodeB device is located within a portion of the first traffic area that is within the border region, and where the eNodeB device is further to:
    receive a request to access a network from a second user device that has powered up within the border region, and
    communicate with the at least one MME, of the first pool of MMEs, to establish a second communication session with the second user device based on the at least one MME and the eNodeB device being located within the first traffic area.

17. One or more non-transitory computer-readable media, comprising:
    one or more instructions, which when executed by at least one processor, cause the at least one processor to:
    receive, from a first mobility management entity (MME), associated with a first pool of MMEs that serve a first traffic area, a notification that a user device, with which a communication session is associated, is to be handed off from an eNodeB, associated with the first traffic area and with which the first MME is communicating,
    where the user device is located within a border region that includes a portion of the first traffic area and a portion of a second traffic area along a boundary between the first traffic area and the second traffic area;
    transmit, to the first MME and based on the notification, an indication that the user device can be handed off from the eNodeB;
    receive, from the user device and as a result of transmitting the indication, a communication that indicates that the user device has been handed off from the eNodeB;
    communicate with the first MME to obtain information that allows the communication session to be maintained with the user device as a result of the user device being handed off from the eNodeB;
    determine that the user device has entered the second traffic area which is served by a second, different pool of MMEs; and
    communicate, with a second MME, associated with the second pool of MMEs, to maintain the communication session with the user device based on the determination that the user device has entered the second traffic area.

18. The one or more non-transitory computer-readable media of claim 17, where the one or more instructions that cause the at least one processor to determine that the user device has entered the second traffic area, further includes:
    one or more instructions, which when executed by the at least one processor, cause the at least one processor to:
        transmit, to the first MME, an indication that the communication session, associated with the user device, will be maintained via the second MME,
        where the indication that the communication session is to be maintained via the second MME causes the first MME to transmit, all or a portion of the information, associated with the communication session, to the second MME.

19. The one or more non-transitory computer-readable media of claim 18, further comprising:
    one or more instructions, which when executed by the at least one processor, cause the at least one processor to:
        receive from another user device that has powered up within the border region, a request to access a network;
        obtain information that identifies with which pool of MMEs to communicate when a request to access the network is received from a user device that powers up within the border region;
        communicate with at least one MME, from the first pool of MMEs, when the information, that identifies with which pool of MMEs to communicate, identifies the first pool of MMEs; and
        communicate with at least one other MME, from the second pool of MMEs, when the information, that identifies with which pool of MMEs to communicate, identifies the second pool of MMEs.

\* \* \* \* \*